United States Patent
Hugosson

(10) Patent No.: US 8,983,131 B2
(45) Date of Patent: Mar. 17, 2015

(54) VIDEO ANALYSIS

(71) Applicant: Axis AB, Lund (SE)

(72) Inventor: Fredrik Hugosson, Lomma (SE)

(73) Assignee: Axis AB, Lund (SE)

( * ) Notice: Subject to any disclaimer, the term of this patent is extended or adjusted under 35 U.S.C. 154(b) by 30 days.

(21) Appl. No.: 13/863,055

(22) Filed: Apr. 15, 2013

(65) Prior Publication Data

US 2013/0301876 A1 Nov. 14, 2013

Related U.S. Application Data

(60) Provisional application No. 61/645,916, filed on May 11, 2012.

(30) Foreign Application Priority Data

May 8, 2012 (EP) .................................... 12167074

(51) Int. Cl.
  *G06K 9/00* (2006.01)
  *G06K 9/32* (2006.01)
  *G06T 7/00* (2006.01)

(52) U.S. Cl.
  CPC ............ *G06K 9/3241* (2013.01); *G06T 7/0097* (2013.01); *G06K 9/00288* (2013.01); *G06T 2207/10016* (2013.01); *G06T 2207/20016* (2013.01); *G06T 2207/20144* (2013.01)
  USPC ......................................................... 382/103

(58) Field of Classification Search
  USPC ................................................ 382/103, 284
  See application file for complete search history.

(56) References Cited

U.S. PATENT DOCUMENTS

| 5,657,402 | A * | 8/1997 | Bender et al. ................. 382/284 |
| 7,015,954 | B1 * | 3/2006 | Foote et al. ................. 348/218.1 |
| 7,801,331 | B2 | 9/2010 | Hinkel et al. |
| 2004/0223058 | A1 * | 11/2004 | Richter et al. ............. 348/207.1 |
| 2005/0275721 | A1 | 12/2005 | Ishii |
| 2006/0159342 | A1 | 7/2006 | Sun et al. |
| 2009/0003652 | A1 | 1/2009 | Steinberg et al. |
| 2011/0115917 | A1 | 5/2011 | Lee et al. |

FOREIGN PATENT DOCUMENTS

| WO | WO 00/51345 | 8/2000 |
| WO | WO 02/30122 A1 | 4/2002 |
| WO | WO 2008/132130 A1 | 11/2008 |

OTHER PUBLICATIONS

European Search Report mailed Dec. 4, 2012, issued for European Application No. 12167074.9, filed May 8, 2012.

* cited by examiner

*Primary Examiner* — Tom Y Lu
(74) *Attorney, Agent, or Firm* — Oblon, McClelland, Maier & Neustadt, L.L.P.

(57) ABSTRACT

A method (200) and an object analyzer (104) for analyzing objects in images captured by a monitoring camera (100) uses a first and a second sequence of image frames, wherein the first sequence of image frames covers a first image area (300) and has a first image resolution, and the second sequence of image frames covers a second image area (302) located within the first image area (300) and has a second image resolution higher than the first image resolution. A common set of object masks is provided wherein object masks of objects (304) that are identified as being present in both image areas are merged.

18 Claims, 1 Drawing Sheet

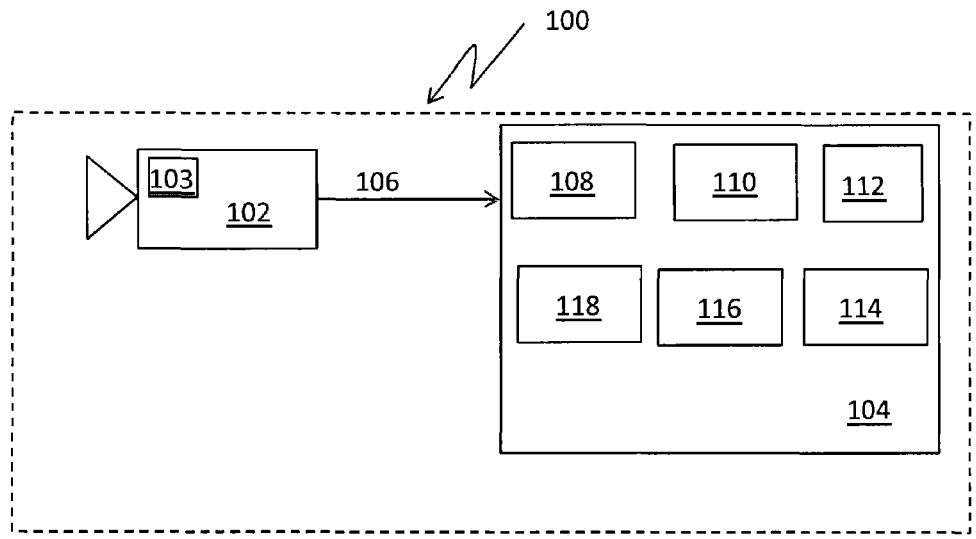
FIG 1
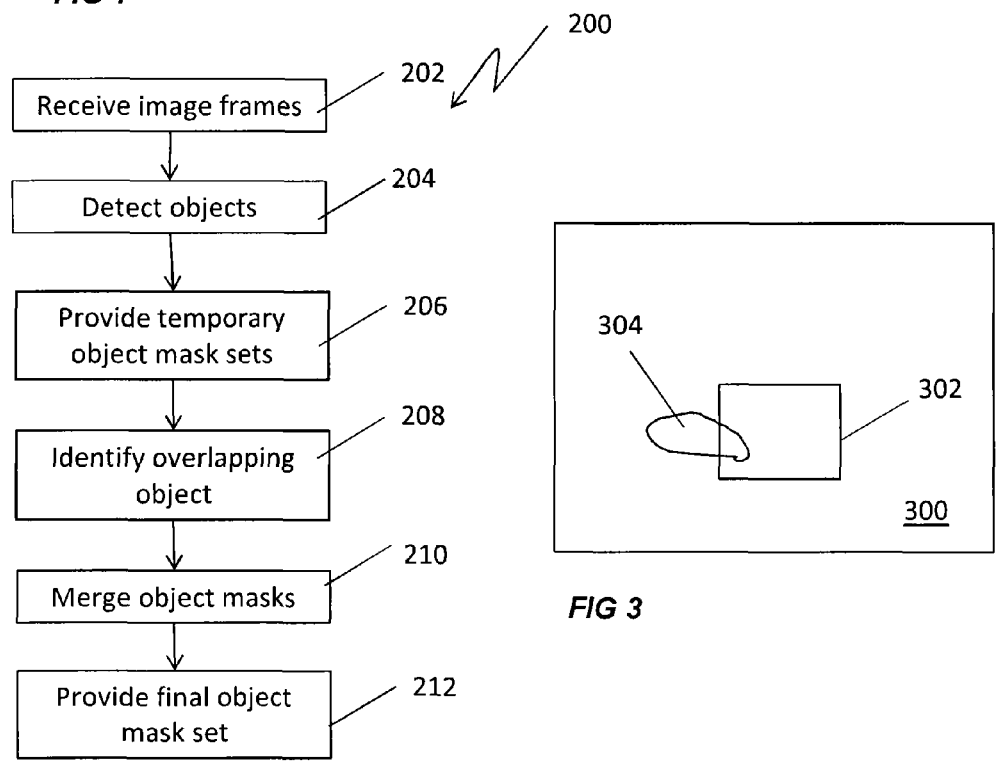
FIG 2
FIG 3

VIDEO ANALYSIS

CROSS-REFERENCE TO RELATED APPLICATIONS

The present application claims the benefit of the earlier filing date of U.S. Provisional Patent Application Ser. No. 61/645,916, filed on May 11, 2012, and EP Application No. 12167074.9, filed on May 8, 2012, the entire contents of each of which being incorporated herein by reference.

TECHNICAL FIELD OF THE INVENTION

The present invention relates to methods and devices for video analysis.

BACKGROUND OF THE INVENTION

Image processing is commonly used with monitoring cameras, e.g. for detecting and tracking objects present in a monitored environment. When object detection and tracking is performed, a scene description is often provided containing so called meta data associated with objects present in the monitored scene. Such meta data may include different descriptive features of objects, and may be used instead of, or in addition to, the actual image data of the scene and the objects present therein.

Depending on the detail level of the image data from the camera, different types of meta data may be extracted. As an example, for image data with a high resolution, meta data such as the type of car may be available, while for image data having a lower resolution only the information that the object is a vehicle may be possible to extract. The detection and analysis of objects present many challenges and improvements are needed in this area.

SUMMARY OF THE INVENTION

An object of the present invention is to improve image analysis and tracking of objects in a scene captured by a monitoring camera.

This and further objects are achieved by a method of analyzing objects in images captured by a monitoring camera according to claim 1, and by means of an object analyzer for analyzing objects in images captured by a monitoring camera. Further embodiments of the invention are presented in the dependent claims.

More specifically, a method of analyzing objects in images captured by a monitoring camera comprises the steps of:
receiving a first sequence of image frames having a first image resolution and covering a first image area
receiving a second sequence of image frames having a second image resolution higher than the first image resolution and covering a second image area being a portion of the first image area,
detecting objects present in the first sequence of image frames
detecting objects present in the second sequence of image frames,
providing a first set of object masks for objects detected in the first sequence of image frames,
providing a second set of object masks for objects detected in the second sequence of image frames,
identifying an object present in the first and the second sequence of image frames by identifying a first object mask in the first set of object masks at least partly overlapping a second object mask in the second set of object masks,
merging the first and the second object mask into a third object mask by including data from the first object mask for parts present only in the first image area, and data from the second object mask for parts present in the second image area, and
providing a third set of object masks including
the first set of object masks excluding the first object mask,
the second set of object masks excluding the second object mask, and
the third object mask.

This makes it possible to provide one common scene description for both sequences of image frames, where objects appearing in both sequences may be associated with meta data combined from both of the sequences of image frames. One and the same object will be represented only once in the scene description and only one scene description will be used in the further processing of the material from the monitoring camera, this in turn also saving bandwidth and reducing the amount of data to be analyzed. Further, this improves the possibility of following an object moving across the scene.

Those parts of the third object mask representing parts of an identified object that are present in the second image area, where the image frames have a higher resolution, will be more detailed than the remaining parts of the object mask. Even though only parts of the third object mask has this higher detail level, an analysis of this object mask may still be much easier—the mask of half a human being is still easily recognizable as a human being and nothing else.

The steps of detecting objects may comprise one or more of:
comparing the first and the second sequence of image frames with image data representing a background model,
comparing an image frame with a previously captured image frame in the respective sequence of image frames, and
performing pattern recognition, such as face recognition.

The method may further comprise composing an object description of the identified object by including image data from the first sequence of image frames for parts of the third object mask that are only present in the first sequence of image frames, and image data from the second sequence of image frames for parts of the third object mask present in the second sequence of image frames. In this way an object description is provided which is more detailed in some parts than in others, but which will be much more helpful when analyzing the monitored scene.

More in detail, the step of composing an object description may comprise preparing a first bitmap representation of parts of the object, present in the first sequence of image frames, from the first sequence of image frames, and providing a second bitmap representation of parts of the object, present in the second sequence of image frames, from the second sequence of image frames, and providing a third bitmap representation by combining the first and the second bitmap representation by scaling the first bitmap representation to the second image resolution. This may e.g. include duplicating bitmap elements in the first bitmap representation.

A vector representation of the object may then be provided based on the third bitmap representation.

According to a further embodiment of the invention an object analyzer for analyzing objects in images captured by a monitoring camera comprises an image data input arranged to receive a first sequence of image frames having a first image resolution and covering a first image area, and a second sequence of image frames having a second image resolution higher than the first image resolution and covering a second image area being a portion of the first image area, an object detector arranged to detect objects present in the first sequence of image frames and objects present in the second sequence of image frames, a first object mask set provider arranged to provide a first set of object masks for objects detected in the first sequence of image frames, and a second set of object masks for objects detected in the second sequence of image frames, an object identifier arranged to identify an object present in the first and the second sequence of image frames by identifying a first object mask in the first set of object masks at least partly overlapping a second object mask in the second set of object masks, an object mask merger arranged to merge the first and the second object mask into a third object mask by including data from the first object mask for parts present only in the first image area, and data from the second object mask for parts present in the second image area, a second object mask set provider arranger to provide a third set of objects masks including the first set of object masks excluding the first object mask, the second set of object masks excluding the second object mask, and the third object mask.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of presently preferred embodiments, with reference to the accompanying drawings, in which:

FIG. 1 schematically illustrates a monitoring camera.

FIG. 2 illustrates a method according to embodiments of the invention.

FIG. 3 illustrates image areas monitored by the monitoring camera.

DETAILED DESCRIPTION OF THE INVENTION

Embodiments of the present invention may be implemented in an imaging device capturing video of a scene, e.g. a mechanically or digitally pan- and tiltable monitoring camera 100, parts of which are shown in FIG. 1. Alternatively, the invention may be implemented in any device implementing functions for keeping track of objects, e.g. in a video encoding device, a video server, a video processing device, etc. Further, it should be noted that the different parts of the object analyzer may be implemented either in software or in hardware, or in a combination thereof.

The camera 100 includes an image capturing means 102 arranged to capture images, in the form of sequences of image frames, of a scene. The image capturing means 102 comprises an image sensor 103 for registering image data, and may further comprise a number of conventional components not illustrated in the figures, such as a lens, an image processor for processing image data registered by the image sensor 103, and a memory of any suitable type such as a RAM (Random Access Memory), a hard disc drive or a flash memory etc, for storing processed image data.

Image data in the form of sequences of image frames is fed to an object analyzer 104 via an image data input 106. In particular, as is also illustrated in FIG. 3, the object analyzer 104 receives a first sequence of image frames covering a first, non-zoomed in image area 300, and a second sequence of image frames covering a second, zoomed-in image area 302, being a portion of the first image area 300. The image frames for the first image area 300 has a lower level of detail than the image frames for the second image area 302, or, in other words, the first sequence of image frames has a lower image resolution than the second sequence of image frames. It may be noted that there may be several such second image areas available which are represented in further sequences of image frames with a higher resolution, and the methods and devices described herein are easily adapted to be used in such cases too. Herein below is described the specific case of two sequences of images, but the extension to several other image streams would be straight forward.

The two sequences of image frames may be achieved in different ways, e.g. by the image sensor in the image capturing device being arranged to alternatingly capture images of the second, zoomed-in image area 302 with a high resolution and of the first, zoomed-out area 300 with a lower resolution. Another alternative is to perform appropriate image processing in the image capturing device, typically including downsampling, on image data captured by the image sensor to achieve the two sequences of image frames.

When the two sequences, or streams, of image frames have been received, via the image data input 106, by the object analyzer 104, objects are detected in the two image streams by an object detector 108. This object detection may be performed by using several different methods which are all well known and which will not be described in detail herein. One example is to use algorithms for different forms of pattern recognition, such as face recognition. Another example is to perform a comparison with image data in a background model. This background model may either be a single background model used for both image areas, or it may comprise separate background models for the different image areas. A background model is commonly provided by accumulating historical data in the form of a sequence of images for the image area in question. A further example of object detection is when an image frame is compared with a previous image frame to detect differences between the frames which indicate that a moving object is present. This may also be thought of as a special case of comparison with a background model, where the history only comprises one previous image.

The object analyzer 104 further comprises a first object mask set provider 110 which is arranged to provide first and a second sets of object masks for the objects detected by the object detector 108 in the first and the second sequence of image frames, respectively. An object mask may be defined as a graphical description of an object in an image which includes image elements, e.g. black image elements, where the object is present. In case the object has empty areas within its outer boundary, such as could be the case for a car with open windows, the object mask may contain empty, or e.g. non-black, image elements for such areas.

The two object mask sets represent the starting point of two different scene descriptions and could be further elaborated to contain different types of meta data relating to each of the object masks in each set. However, as the inventors have realized, in these sets of object masks, an object 304 appearing in both image areas 300 and 302 will be represented by one object mask in the first set and another in the second. For the purposes of the method described herein, these two object mask sets may therefore be seen as temporary object mask sets which are used as a basis for providing a final object mask set according to the below.

According to the inventive methods and devices described herein, the object masks deemed to represent one and the same object are merged, and one common scene description incorporating data from both sequences of image streams is composed. More specifically, an object identifier 112 is arranged in the object analyzer 104 to identify objects (one or more) which are present in both sequences of image frames, by identifying overlapping object masks, i.e. object masks that in at least some parts have the same coordinates in both the sets of object masks.

The overlapping object masks are then merged by an object mask merger 114, which merges the object masks which have been identified as representing the same object by including data from the first object mask for parts present only in the first image area, and data from the second object mask for parts present in the second image area, meaning that more detailed object mask data from the second set is used where such is available and the less detailed data from the first set is used for the remaining part of the object mask.

A third, final set of object masks is then provided by a second object mask set provider 116. The third set of object masks contain the merged object mask or masks (in case there is more than one object present in both sequences of image frames), and the remaining object masks from the first set of object masks. Usually, all objects that were detected in the second sequence of image frames and represented by object masks in the second set of object masks would also be present in the first set of object masks, since the second image area is a part of the first image area. There might however be cases where an object is too small or has such a shape that it is not detected in the lower resolution used in the first sequence of image frames. Therefore, in the most general case, one would also add to the third set those object masks from the second set of object masks that are not identified by the object identifier as belonging to an object present in both image areas.

The final set of object masks form the basis for a common scene description containing object descriptions composed by an object description composer 118. Meta data is then collected for the identified objects both from the first and the second sequence of image frames. Such object descriptions may include the object mask for the object, and an identifying marker such as an alphanumeric symbol, as well as the actual image data within the object mask. The object description may also be more elaborate, including data categorizing the object into an object category such as "vehicle" or "human being". It may also contain data on previous movements of the object and other features such as an identity of a person or a license plate registration number of a car. A scene description may contain several object descriptions of objects present in a monitored scene.

The object descriptions for the object or objects which are identified as being present in both sequences of image frames are provided by including or analyzing image data from the first sequence of image frames for parts of the associated object mask that are only present in the first sequence of image frames, and image data from the second sequence of image frames for parts of the associated object mask present in the second sequence of image frames.

In more detail, the object description for those objects that are identified as being present in both sequences of image frames are composed by providing a first bitmap representation of parts of the object present in the first sequence of image frames from the first sequence of image frames, and a second bitmap representation of parts of the object present in the second sequence of image frames from the second sequence of image frames. Those two bitmap representations are then combined into one single bitmap representation by scaling the first bitmap representation to the second image resolution, e.g. by duplicating bitmap elements in the first bitmap representation. Interpolation steps may also be performed if desired. A vector representation of the object is then composed based on this combined bitmap representation of the object.

A method 200 according to embodiments of the invention is illustrated in FIG. 2. In a step 202 a first and a second sequence of image frames are received. The first sequence of image frames covers a first image area 300 and has a first image resolution, and the second sequence of image frames covers a second image area 302 smaller than the first image area and located within the first area 300. The second sequence of image frames has a second image resolution higher than the first image resolution.

In step 204 objects are detected in the first and the second sequence of image frames and in step 206 a first and a second temporary set of object masks are provided for the detected objects. In step 208 an object 304 present in both the first and the second sequence of image frames is identified by identifying a first object mask in the first set of object masks at least partly overlapping a second object mask in the second set of object masks and in step 210 these object masks are merged into a third object mask.

Finally, in step 212, a final, third set of object masks is provided including the first set of object masks excluding the first object mask, the second set of object masks excluding the second object mask, and the third object mask.

In other words, a method and an object analyzer for analyzing objects in images captured by a monitoring camera uses a first and a second sequence of image frames, wherein the first sequence of image frames covers a first image area and has a first image resolution, and the second sequence of image frames covers a second image area located within the first image area and has a second image resolution which is higher than the first image resolution. A common set of object masks is provided wherein object masks of objects that are identified as being present in both image areas are merged.

The invention claimed is:

1. A method of analyzing objects in images captured by a monitoring camera, comprising the steps of:
   receiving, by an electronic device, a first sequence of image frames having a first image resolution and covering a first image area;
   receiving, by the electronic device, a second sequence of image frames having a second image resolution higher than the first image resolution and covering a second image area being a portion of the first image area;
   detecting, by the electronic device, objects present in the first sequence of image frames;
   detecting, by the electronic device, objects present in the second sequence of image frames;
   providing, by the electronic device, a first set of object masks for objects detected in the first sequence of image frames;
   providing, by the electronic device, a second set of object masks for objects detected in the second sequence of image frames;
   identifying, by the electronic device, an object present in the first and the second sequence of image frames by detecting a first object mask in the first set of object masks at least partly overlapping a second object mask in the second set of object masks;
   merging, by the electronic device, the first and the second object mask into a third object mask by including data from the first object mask for parts present only in the first image area, and data from the second object mask for parts present in the second image area; and
   providing, by the electronic device, a third set of object masks including
      the first set of object masks excluding the first object mask;
      the second set of object masks excluding the second object mask; and
      the third object mask.

2. The method of claim 1, wherein the steps of detecting objects comprise comparing the first and the second sequence of image frames with image data representing a background model.

3. The method of claim 1, wherein the steps of detecting objects comprise comparing an image frame with a previously captured image frame in the respective sequence of image frames.

4. The method of claim 1, wherein the steps of detecting objects comprise performing pattern recognition, such as face recognition.

5. The method of claim 1, further comprising composing an object description of the identified object by including image data from the first sequence of image frames for parts of the third object mask that are only present in the first sequence of image frames, and image data from the second sequence of image frames for parts of the third object mask present in the second sequence of image frames.

6. The method of claim 5, wherein the step of composing an object description comprises providing a first bitmap representation of parts of the identified object, present in the first sequence of image frames, from the first sequence of image frames, and providing a second bitmap representation of parts of the identified object, present in the second sequence of image frames, from the second sequence of image frames, and providing a third bitmap representation by combining the first and the second bitmap representation by scaling the first bitmap representation to the second image resolution.

7. The method of claim 6, wherein the step of composing an object description comprises providing a vector representation of the identified object based on the third bitmap representation.

8. An object analyzer for analyzing objects in images captured by a monitoring camera, the object analyzer comprising
   an image data input arranged to receive a first sequence of image frames having a first image resolution and covering a first image area, and a second sequence of image frames having a second image resolution higher than the first image resolution and covering a second image area being a portion of the first image area,
   an object detector arranged to detect objects present in the first sequence of image frames and objects present in the second sequence of image frames,
   a first object mask set provider arranged to provide a first set of object masks for objects detected in the first sequence of image frames, and a second set of object masks for objects detected in the second sequence of image frames,
   an object identifier arranged to identify an object present in the first and the second sequence of image frames by identifying a first object mask in the first set of object masks at least partly overlapping a second object mask in the second set of object masks,
   an object mask merger arranged to merge the first and the second object mask into a third object mask by including data from the first object mask for parts present only in the first image area, and data from the second object mask for parts present in the second image area,
   a second object mask set provider arranged to provide a third set of object masks including
      the first set of object masks excluding the first object mask,
      the second set of object masks excluding the second object mask, and
      the third object mask.

9. The object analyzer of claim 8, wherein the object detector is arranged to compare an image frame with a previously captured image frame in the respective sequence of image frames.

10. The object analyzer of claim 8, wherein the object detector is arranged to compare the first and the second sequence of image frames with image data representing a background model.

11. The object analyzer of claim 8, wherein the object detector is arranged to perform pattern recognition, such as face recognition.

12. The object analyzer of claim 8, further comprising an object description composer arranged to provide an object description of the identified object by including image data from the first sequence of image frames for parts of the third object mask that are only present in the first sequence of image frames, and image data from the second sequence of image frames for parts of the third object mask present in the second sequence of image frames.

13. The object analyzer of claim 12, wherein the object description composer is arranged to
   provide a first bitmap representation of parts of the identified object, present in the first sequence of image frames, from the first sequence of image frames, and a second bitmap representation of parts of the identified object, present in the second sequence of image frames, from the second sequence of image frames, and provide a third bitmap representation by combining the first and the second bitmap representation by scaling the first bitmap representation to the second image resolution.

14. The object analyzer of claim 13, wherein the object description composer is arranged to provide a vector representation of the identified object based on the third bitmap representation.

15. A non-transitory computer-readable medium including computer-program instructions, which when executed by an information processing system, cause the information processing system to:

receive a first sequence of image frames having a first image resolution and covering a first image area;

receive a second sequence of image frames having a second image resolution higher than the first image resolution and covering a second image area being a portion of the first image area;

detect objects present in the first sequence of image frames;

detect objects present in the second sequence of image frames;

provide a first set of object masks for objects detected in the first sequence of image frames;

provide a second set of object masks for objects detected in the second sequence of image frames;

identify an object present in the first and the second sequence of image frames by detecting a first object mask in the first set of object masks at least partly overlapping a second object mask in the second set of object masks;

merge the first and the second object mask into a third object mask by including data from the first object mask for parts present only in the first image area, and data from the second object mask for parts present in the second image area; and provide a third set of object masks including the first set of object masks excluding the first object mask;

the second set of object masks excluding the second object mask; and the third object mask.

16. The non-transitory computer-readable medium of claim 15, wherein the system includes one or more of an imaging device, a video encoding device, a video server and a video processing device.

17. An information processing system comprising:

circuitry configured to receive a first sequence of image frames having a first image resolution and covering a first image area;

receive a second sequence of image frames having a second image resolution higher than the first image resolution and covering a second image area being a portion of the first image area;

detect objects present in the first sequence of image frames;

detect objects present in the second sequence of image frames;

provide a first set of object masks for objects detected in the first sequence of image frames;

provide a second set of object masks for objects detected in the second sequence of image frames;

identify an object present in the first and the second sequence of image frames by detecting a first object mask in the first set of object masks at least partly overlapping a second object mask in the second set of object masks;

merge the first and the second object mask into a third object mask by including data from the first object mask for parts present only in the first image area, and data from the second object mask for parts present in the second image area; and provide a third set of object masks including the first set of object masks excluding the first object mask;

the second set of object masks excluding the second object mask; and the third object mask.

18. The information processing system of claim 17, wherein the information processing system is one or more of an imaging device, a video encoding device, a video server and a video processing device.

* * * * *